Aug. 16, 1960 O. K. AUSTIN 2,948,918
WATER SPRAY IN PELLET MILLS
Filed Oct. 16, 1953
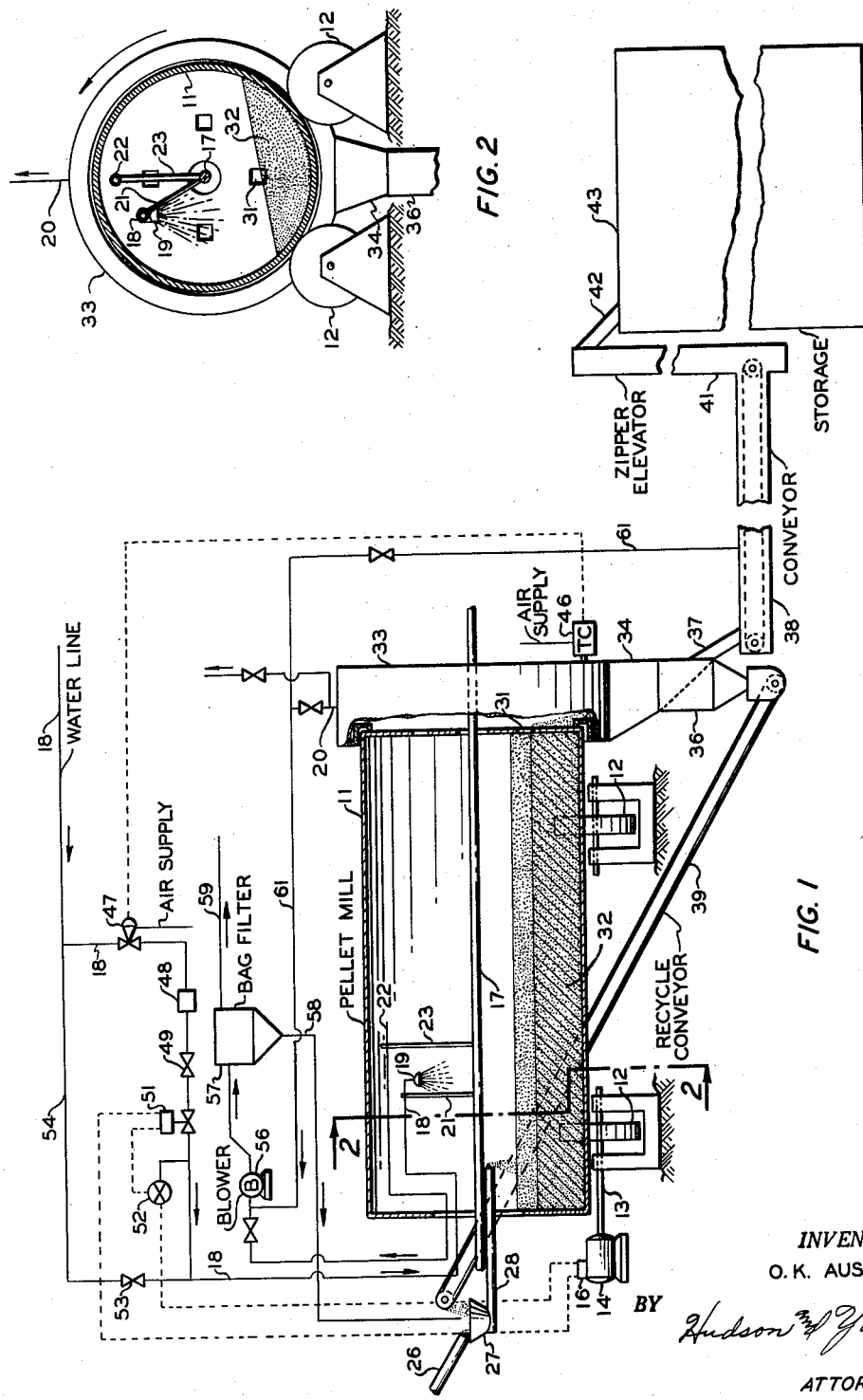
INVENTOR.
O. K. AUSTIN
BY Hudson & Young
ATTORNEYS

2,948,918

Patented Aug. 16, 1960

2,948,918
WATER SPRAY IN PELLET MILLS

Oliver K. Austin, Borger, Tex., assignor to Phillips Petroleum Company, a corporation of Delaware Filed Oct. 16, 1953, Ser. No. 386,585

21 Claims. (Cl. 18—1)

This invention relates to the pelleting of hot carbon black.

In the manufacture of carbon black by various methods, it is common practice to pass the hot carbon black from the manufacturing process directly to a pelleting mill which pellets the loose black by rolling the same in a similar manner to the technique utilized in a tumbling drum. In rolling the particles of loose black, nuclei are formed and these gather particles of the black until small, generally spherical pellets have been formed. The loose black is conventionally introduced to the horizontally rotating cylindrical pelleting mill at one end and as the material is formed into pellets the same progress through the mill to the outlet openings in the delivery end of the mill. The effluent pellets pass by gravity to a conveyor belt which receives the hot pellets and transfers them to packaging or storage or to conveyor equipment which delivers them into a railroad car, ship, or other vehicle for transportation to the point of utilization. One or more conveyor belts may be necessary in conveying the pellets to storage or to shipping facilities.

In conventional processes the hot black is introduced to the pellet mill at a temperature in the range of approximately 150–300° F. During the pelleting the temperature is increased to the range of 250–400° F. by friction and the effluent pellets cause rapid deterioration of the rubber-containing composition of which conveyor belts are usually manufactured and it is therefore highly desirable to reduce the temperature of the effluent pellets to a level which does not rapidly deteriorate the belts.

The principal object of the invention is to provide a process and apparatus for pelleting hot carbon black which simultaneously cools the carbon black to facilitate handling of the same. It is also an object of the invention to provide a process and apparatus for pelleting hot carbon black which materially increases the life of conveyor belts used in handling the resulting pellets directly from the mill. Another object is to reduce dust in pelleting carbon black and thereby increase the production of pellets and avoid losses of loose carbon black. Another object is to increase the pellet density at constant feed rate or increase feed rate at constant density. A further object is to provide a process and apparatus for regulating the temperature of the pellets produced by a hot carbon black pelleting process. Other objects of the invention will become apparent from a consideration of the accompanying disclosure.

I have found a method whereby water can be sprayed onto the hot carbon black in the mill as it is being pelleted so as to materially reduce the temperature of the pellets without incorporating in the pelleted product a greater amount of moisture than is permitted by market specifications on pelleted carbon black. Specification grade carbon black requires a moisture content of not more than one percent and it is absolutely essential to maintain the moisture content of the finished pellets below about one percent in order to meet market specifications. I have found a method by which carbon black in a pelleting mill can be reduced in temperature from the range of 250–400° F. down to a temperature in the range of 100–225° F. by spraying from about 4–24 weight percent of water onto the bed of black in the mill without raising the moisture content of the finished pellets to more than one percent by weight and that the life of the conveyor belts is materially increased by such a reduction in the temperature of the finished pellets. Temperatures of 200° F. and higher have a deleterious effect on typical conveyor belt compositions and the invention is applicable in all cases where the effluent carbon black pellets are at a temperature above about 200° F.

On a mill 8' in diameter and 48' long it has been found advantageous to position the spray nozzle approximately 31' from the discharge end of the mill in order to obtain maximum efficiency in cooling the pellets without raising the water content of the finished pellets up to the one percent limit. However, the water may be sprayed in a fine stream onto the bed of pellets at any point in the forward half of the mill with good results. It is advantageous to simultaneously withdraw water vapor from the mill above the pellet bed during the spraying step so as to avoid exceeding the maximum permissible water content of the pellets. This is effectively accomplished by installing in the mill, or in the conveyor housing downstream of the mill, an exhaust line containing a blower which exhausts gas from the system and delivers the same, together with entrained black particles in the form of dust, to a bag filter or other separation means which recovers the black and vents the moisture-laden air. Return of the recovered black to the feed end of the mill conserves carbon and also has the added advantage of reducing the amount of dust in the pelleted product. This can also be accomplished by insulating the mill hood and installing a vent stack on the hood to expell moisture vapor.

The amount of water sprayed onto the carbon black can be properly regulated in various ways, but it is especially advantageous to automatically control the amount of water so as to obtain a product of constant, predetermined temperature. This is done by attaching a temperature-recorder-controller to the system downstream of the mill and preferably on the hood covering the delivery end of the mill and connecting this temperature-recorder-controller with a motor valve in the water supply line to the spray. The instrument can be set for the desired pellet temperature, such as one in the range of 150–225° F., and the flow of water is then regulated so as to maintain the set temperature. It is also feasible to set the valve on the water line so as to deliver a predetermined quantity of water to the pellet bed which is adjusted to the rate of flow of loose black to the mill. It has been found that regulation of the water stream so as to deliver from 2–24 pounds of water to every 100 pounds of black satisfactorily reduces the temperature without exceeding the specification on water content. In one application of the invention a water rate of approximately 12 gallons per hour, with a production of 30,000 pounds of black per day, maintained the moisture content of the product below 0.5 weight percent.

For a more complete understanding of the invention, reference may be had to the drawing of which Figure 1 is an elevation, partly in cross section, illustrating diagrammatically a preferred embodiment of the invention, while Figure 2 is a cross sectional view of the pellet mill of Figure 1 taken on the line 2—2.

In Figure 1, a pellet mill 11 is supported by a series of wheels 12 aligned on axles 13 at the base of the mill, either side of the perpendicular plane running through the axis of the mill. A motor 14, having a starting box 16, drives one of the axles 13 so as to rotate the mill. A center support pipe 17 extends completely through the mill at the approximate axis thereof and is supported on piers (not shown) outside of the mill. Support pipe 17 is utilized to support a scraping device (not shown) inside the mill which scrapes black off the walls of the mill and avoids caking thereof with detriment to the pelleting process. Center pipe 17 also supports water line 18, together with spray nozzle 19, by means of one or more supports 21. Also supported on the center pipe is exhaust line 22 supported by one or more supports 23.

Loose black from the furnace is delivered to the mill through line 26 leading to hopper 27 at the outer end of conveyor 28, which delivers the loose black to a point inside the mill. Conveyor 28 may also be supported by center pipe 17. As the loose black passes through the mill and is formed into pellets, the same are passed by gravity through the delivery end of the mill by means of openings 31 which are generally partially covered by adjustable weirs (not shown) which regulate the depth of the bed 32 maintained in the mill.

The delivery end of mill 11 is covered by a hood 33 which is supported by center pipe 17 and is sealed rather closely with the end of the mill and with the center pipe. On the lower side of the hood is a hopper 34 which receives the finished pellets and delivers a portion through screen 36 and another portion to chute 37 leading to conveyor 38. The pellets passing through screen 36 are carried by recycle elevator or conveyor 39 to hopper 27 for delivery to the mill along with the loose black feed. Conveyor 38 comprises a housed conveyor belt which in turn delivers finished pellets to another conveyor belt which transfers the pellets to storage or to shipping or packaging facilities. In the modification shown conveyor 38 leads to an elevator conveyor 41 which transfers the pellets to chute 42 for delivery to storage tank 43. One of the best types of conveyors is an endless zipper belt conveyor which receives pellets and is zippered shut and delivers the pellets at the opposite end of the conveyor when the belt is inverted and the zipper side is opened. The zipper belts and other conveyor belts are of necessity manufactured of rubber-containing materials which are deleteriously affected by high temperatures.

The water flow control system comprises a temperature-recorder-controller 46 maintained on the hood 33 of the mill so as to be responsive to the temperature of the effluent pellets. This instrument is connected by means of an air line or other control line with motor valve 47 so as to be in actuating connection with the same. Both instrument 46 and motor valve 47 are connected with an air supply for operation of the instruments. Water line 18 contains a rotameter 48, which accurately determines the rate of flow, needle valve 49, and an automatic solenoid valve 51 which automatically shuts off the flow of water when motor 14 is stopped or fails. Solenoid valve 51 is connected to the starting box 16 of motor 14 and is also connected with an automatic under pressure switch 52 which shuts off the flow of water by shutting valve 51 when the pressure in the line drops below a minimum, such as 25 pounds p.s.i.g. Switch 52 is essential in order to shut off flow of water when a break in line 18 inside the mill occurs with resultant formation of carbon mud if the water is not shut off. Valve 53 in bypass line 54 provides for passing water directly to the mill without passing through the instrument line.

The apparatus of Figure 1 shows three arrangements of the evacuation line for withdrawing water vapor and carbon-laden air from the mill. Line 22 leads directly into the mill and passes to a blower 56, which withdraws or exhausts air and moisture vapor from the mill and delivers the stream to a filter 57. Filter 57 removes the carbon black fines, delivering them to recycle line 58, and vents the air and water vapor to the atmosphere via line 59. Line 20 vents the mill hood directly to the atmosphere or to exhaust line 61, as desired. The other arrangement of the exhaust line connects line 61 with the housing of elevator 38 at any suitable point intermediate the ends thereof. In this modification air and moisture vapor are exhausted from both the mill and from the elevator housing, either side of the point of connection of line 61 with the elevator housing. The preferred manner of operation is that in the first modification, whereby the exhaust line withdraws gas and carbon dust directly from the inside of the mill and from the elevator housing and intermediate connecting elements.

Referring to Figure 2, this view shows the shell of mill 11 and the carbon black bed 32 as the mill rotates counterclockwise. The relative positions of center pipe 17, water pipe 18, spray 19, and exhaust line 22 are also shown, as well as delivery openings or weirs 31. The arrangement of supporting wheels 12, together with hood 33 and delivery hopper 34 leading into screen 36 is shown, but other details are omitted in this figure.

In operation, evacuation of the mill and connecting elements by blower 56 results in air entering the mill through small open spaces or cracks between the sealing means and the mill where hood 33 engages the mill and where pipe 17 projects through the mill ends and the sealing means associated therewith. Air also enters the system through joints and openings in the conveyor housing and connecting elements. The flow of air into the system in this manner aids in evacuation of moisture and dust from the system and prevents appreciable condensation of moisture within the system downstream of the rotating cylinder, thereby avoiding formation of carbon mud with its attendant problems.

The following illustrative example is presented in order to provide a more complete understanding of the invention. It is to be understood that the specific modification and details presented are merely illustrative and are not to be interpreted as unnecessarily limiting the invention.

EXAMPLE

The invention has been installed and utilized on a series of pellet mills 8' in diameter and 48' long substantially in accordance with the showing of the drawing. Data obtained in various runs in one of the mills are presented in Table I. The mill used in the runs utilized an exhaust line connected with conveyor housing just downstream of the mill.

Table I

| Run No. | Feed Rate, Lb./Day | Bed Depth, Inches | Water Rate, Gal./Hr. | Moisture Content of Product, Percent | Temperature Pellets Top Recycle, Belt, °F. |
|---|---|---|---|---|---|
| 1 | 30,000 | 17 | 0 | 0.10 | 385 |
| 2 | 32,000 | 17 | 11.5 | 0.62 | 160 |
| 3 | 30,000 | 25 | 12.5 | 0.20 | 210 |
| 4 | 35,000 | 25 | 14.0 | 0.045 | 200 |

Screen analysis and density were measured on pellets from run No. 4 and the data are presented in Table II.

Table II

[Screen analysis (wt. percent)]

| Density Lb./Cf. | | −10 +18 | −18 +35 | −35 +60 | −60 +120 | −120 |
|---|---|---|---|---|---|---|
| 24.8 | +10 | | | | | |
| | 0.45 | 2.35 | 78.7 | 99.0 | 99.6 | 0.4 |

In addition to cooling the pellets and increasing the life of the zipper belts, it was found that there was also an increase in the efficiency of the pelleting process caused by a reduction in oxidation of the black and the effluent pellet stream contained considerably less dust than was present in the stream from the mill before the use of water spray in the mill. Moreover, the process produced pellets of one pound higher density than were produced at the same rate without water spraying. It was also found that pellets of the same density as conventionally produced could be made at a faster rate. In other words, the inventive process permits either a faster production rate or production of a more dense pellet, or a combination of these advantages.

It was also found that spraying without exhausting gas from the mill during the spraying, or without insulating the mill hood, made it difficult, if not impossible, to stay within specification on moisture content of the product pellets and it also resulted in formation of some carbon black mud on the screen under the hood, necessitating frequent cleaning of the screen in order to maintain adequate recycle of carbon black.

In instances where the carbon black pellets are to be incorporated in an aqueous dispersion of rubberlike material or an elastomer, it is advantageous to incorporate in the water a small amount of a wetting or dispersing agent, such as one or more of those listed by Van Antwerpen in "Surface-Active Agents," published in Industrial and Engineering Chemistry, vol. 33, No. 1, pages 16–22, January 1941; and vol. 35, No. 1, pages 107–117 and 126–130, January 1943. Agents soluble in the water being sprayed and nonvolatile under pelleting temperatures should be selected.

Numerous modifications of the invention can be made within the scope of the preceding disclosure. It should be realized that the illustrative details set forth herein are merely explanatory and should not be construed as unnecessarily limiting the invention.

I claim:

1. In a process for pelleting hot, dry, flocculent carbon black in a rotating mill in which the temperature of the effluent pellets is above about 250° F., the method of reducing the temperature of the pellets in the mill and simultaneously increasing pelleting efficiency and density, and reducing dust content of the pelleted product comprising spraying water onto the already formed pellets in the pellet bed in said mill at a controlled rate in the range of 2 to 24 pounds per 100 pounds of black so as to reduce the temperature of the effluent pellets to a temperature below about 225° F. increase pelleting efficiency and density, and reduce dust in the pelleted product, and vaporizing the major portion of said water from said pellets before they leave said mill.

2. The process of claim 1 in which the rate of water flow is regulated so as to produce effluent pellets in which the water content is below about one percent by weight.

3. In a process comprising pelleting hot, dry, flocculent carbon black in an elongated cylindrical mill rotating with its axis horizontal, wherein said carbon black is continuously fed into one end of said mill and becomes pelleted as it passes toward the opposite end in the form of a bed of pellets containing carbon black dust in a lower section of said mill, and pellets containing dust are continuously withdrawn from the top of said bed at the lower end of said mill; the improvement comprising spraying aqueous liquid onto the top of the dry pellet bed comprising already formed pellets in a section thereof downstream a substantial distance from the incoming carbon black at a rate in the range of 2 to 24 pounds of water per 100 pounds of black so as to cool said pellets, increase the pelleting efficiency and reduce the dust content of the effluent pellets, whereby the heat of said black drives water from said pellets downstream of the spray area so as to leave less than about one weight percent of water in said pellets as they pass from said mill.

4. The process of claim 3 in which gases and entrained carbon black are evacuated from said mill and the evacuated gases and carbon black are passed through a filter so as to recover carbon black and the same is returned to the feed end of the mill.

5. The process of claim 1 including the steps of exhausting from said mill gas and water vapor together with entrained carbon black, recovering said entrained carbon black from the effluent gas stream, and returning same to said mill as feed.

6. The process of claim 1 in which the rate of flow of water through the spray is regulated in response to deviations in the temperature of the effluent carbon black pellets from a predetermined temperature in the range of 100–225° F. so as to maintain a relatively constant temperature in said range.

7. Apparatus for pelleting carbon black comprising in combination a horizontally elongated rotatable cylindrical pellet mill having an unobstructed smooth inner cylindrical surface, a carbon black feeder leading into one end, and a pellet outlet in the opposite end spaced from the periphery of said mill; a spray means in said mill provided with orifices downwardly directed to spray liquid onto a pellet bed in a lower section thereof spaced downstream from the inlet end of said feeder so as to permit dry pelleting between said feeder and the spray area and having a water line connected therewith; and an exhaust line leading from said mill having an exhaust means therein.

8. The apparatus of claim 7 including a motor valve in said water line; a temperature-recorder-controller in communication with said pellet outlet and connected in actuating arrangement with said motor valve so as to vary the flow of water through said spray means in response to deviations in the temperature in said outlet from a predetermined pellet temperature.

9. Apparatus for pelleting carbon black comprising in combination a horizontally elongated rotatable cylindrical pellet mill having an unobstructed smooth internal cylindrical surface, a carbon black feeder leading into one end and pellet outlet means in the opposite end intermediate the axis of said mill and its periphery; a spray means in said mill spaced downstream of the delivery end of said feeder a substantial distance and provided with orifices downwardly directed toward the lower section thereof and having a water line connected therewith; a housed endless-belt type conveyor leading away from said pellet outlet so as to form with said mill a continuous enclosed pellet passageway; and an exhaust line having an exhaust means therein connected with said pellet passageway for evacuation of gas and water vapor from same.

10. The apparatus of claim 9 in which said exhaust line connects with said housed conveyor.

11. The apparatus of claim 9 in which said exhaust line leads into said pellet mill.

12. In combination with the apparatus of claim 9 a motor valve in said water line; and a temperature-recorder-controller in communication with said pellet outlet and connected in actuating arrangement with said motor valve so as to be adapted to vary the flow of water through said spray means in response to deviations in the temperature in said outlet from a predetermined pellet temperature.

13. Apparatus for pelleting carbon black comprising in combination a horizontally elongated rotatable cylindrical pellet mill having a carbon black feeder leading into one end and pellet outlet means in the opposite end intermediate the axis of said mill and its periphery; a spray means in said mill positioned downstream a substantial distance from the delivery end of said feeder and having downwardly directed orifices therein to allow dry pelleting before spray liquid is delivered onto the pelleted black in said mill; an insulated hood on the outlet end of said mill having a vent therein for withdrawal of moisture vapor from said hood and mill.

14. The apparatus of claim 13 in which said vent is connected with an exhaust means.

15. The process of claim 1 including the step of incorporating a minor but material amount of a wetting agent in the water sprayed onto said pellet bed.

16. The method of converting fluffy carbon black into an improved compacted form, which comprises compacting dry fluffy carbon black substantially in the absence of liquid until it is formed into a bed of dry compacted carbon black pellets, thereafter while maintaining the material in tumbling motion applying evenly to it a finely divided aqueous liquid in an amount equivalent to from 2 to 24 percent of the weight of the carbon, and thereafter drying the material to obtain an improved compacted carbon.

17. The method of converting fluffy carbon black into an improved compacted form, which comprises compacting dry fluffy carbon black by tumbling it substantially in the absence of liquid until it is formed into a bed of dry compacted carbon black pellets, thereafter while maintaining the material in motion applying evenly to it a finely divided aqueous liquid in an amount equivalent to from 2 to 24 percent of the weight of the carbon, and thereafter drying the material to obtain an improved compacted carbon.

18. The method of converting fluffy carbon black into an improved compacted form, which comprises compacting dry fluffy carbon black by tumbling it continuously in the substantial absence of liquid until it is formed into a bed of dry compacted carbon black pellets, thereafter while continuously tumbling the compacted carbon evenly applying to it a finely atomized spray of aqueous liquid in an amount equivalent to from 2 to 24 percent of the weight of the carbon, and thereafter drying the material while tumbling it to obtain an improved compacted carbon.

19. A method as described in claim 18, said liquid being water.

20. A method as described in claim 18, said liquid being an aqueous solution of a substance adhesive to the carbon.

21. In a process for pelleting carbon black, the improvement which comprises applying an aqueous liquid evenly to theretofore dry-pelleted carbon black containing dust while tumbling said pellets and dust, said liquid being added in an amount equivalent to from 2 to 24 percent by weight of the carbon, and subsequently removing a major portion of said aqueous liquid from said pellets so as to produce pellets of reduced dust content.

References Cited in the file of this patent

UNITED STATES PATENTS

| | | |
|---|---|---|
| 1,892,074 | Nielsen | Dec. 27, 1932 |
| 2,164,164 | Price | June 27, 1939 |
| 2,268,816 | Gabeler et al. | Jan. 6, 1942 |
| 2,538,482 | Studebaker | Jan. 16, 1951 |
| 2,602,187 | Samler | July 8, 1952 |